O. O. STORLE.
GUARD FOR ROTARY MACHINE ELEMENTS.
APPLICATION FILED FEB. 27, 1914.

1,236,119.

Patented Aug. 7, 1917.

Witnesses:
Fred Palm
Chas L. Goss

Inventor:
Ole O. Storle
By Flanders Bottum Fawsett & Bottum
Attorneys.

UNITED STATES PATENT OFFICE.

OLE O. STORLE, OF TACOMA, WASHINGTON, ASSIGNOR TO THE STORLE ENGINE COMPANY, OF KEWAUNEE, WISCONSIN.

GUARD FOR ROTARY MACHINE ELEMENTS.

1,236,119.   Specification of Letters Patent.   Patented Aug. 7, 1917.

Application filed February 27, 1914. Serial No. 821,380.

*To all whom it may concern:*

Be it known that I, OLE O. STORLE, a citizen of the United States, residing at Tacoma, in the county of Pierce and State of Washington, have invented certain new and useful Improvements in Guards for Rotary Machine Elements, of which the following is a specification, reference being had to the accompanying drawing, forming a part thereof.

The main object of this invention is to prevent accidents resulting from clothing being caught and wound upon rotating wheel hubs, the exposed ends of shafts, and the like.

It consists essentially in a cap or cup-shaped shield adapted to inclose and turn freely upon and independently of an exposed wheel hub, shaft end or the like.

In the accompanying drawing illustrating a number of forms and modes of applying the device, like characters designate the same or similar parts in the several figures.

Figure 1:
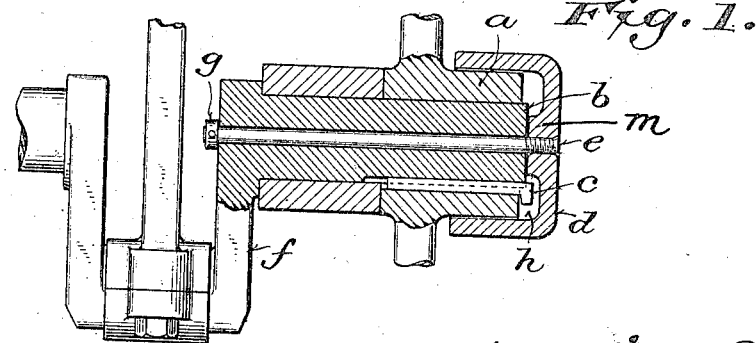
Figure 2:
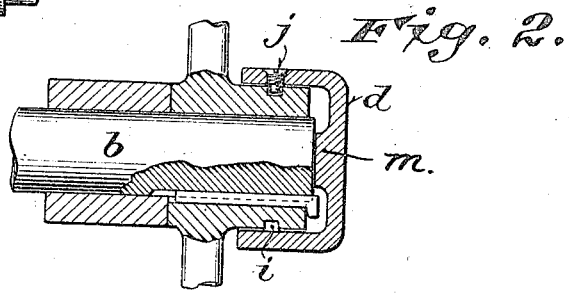
Figure 3:
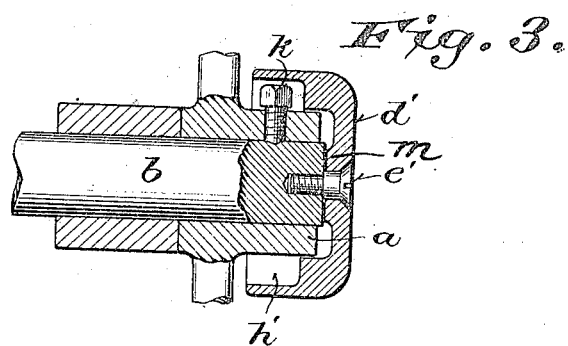
Figure 4:
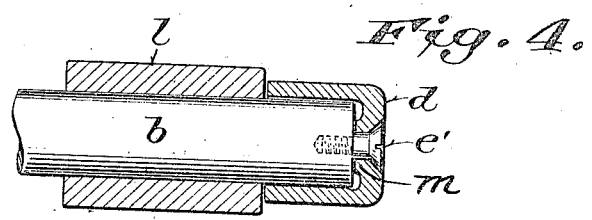

Figure 1 is an axial section of one embodiment of the invention as applied to a wheel hub keyed on a crank shaft; Fig. 2 is a similar view showing other means of loosely confining the cap or shield on a wheel hub or the like, so that the latter may turn freely in the former; Fig. 3 is another similar view of a modified form of cap or shield as applied to a wheel hub which is secured on a shaft by a set screw; and Fig. 4 is still another similar view showing a protecting cap or shield pivotally mounted and loosely confined on the projecting end of a shaft.

Referring to Fig. 1 showing one form of guard embodying the invention and one method of rotatably securing the same on a wheel hub, *a* designates the hub of a wheel, as for example, a fly wheel of an engine, which is fastened in a well known manner on the end of a crank shaft *b*, by a key *c*, the head or end of the key projecting somewhat beyond the outer end of the hub and shaft.

*d* is a flanged cap or cylindrical cup-shaped shield loosely fitting over and covering the outer exposed end of the hub, which is free to rotate therein. In the present case the cap or shield is rotatably held in place on the hub by an axial connection consisting of a bolt or rod *e*, fastened by screw threads or otherwise centrally in the end of the cap or shield and passing therefrom loosely through an axial bore in the shaft *b* into the space between the arms of the crank *f*, its inner end being provided with a collar *g*, pinned thereon, or with other detachable means for removably securing the bolt or rod with the cap or shield *d*, in place.

The end of the cap is formed around a central internal bearing *m* with an internal annular recess *h*, to clear the protruding head or end of the key *c* and to permit it to rotate freely with the shaft in the cap or shield when the latter is arrested.

By this arrangement, the cap or shield covering or inclosing the outer end of the hub and the protruding end of the key and having a smooth exterior surface, the clothing of a person coming in contact with the cap or shield is prevented from being caught by the key or hub and twisted or wound thereon, and thereby injuring the person. If loose garments or parts of the clothing of a person should be accidentally wrapped or caught on the cap or shield, the latter would be arrested, while the hub continued to rotate freely therein, without causing any injury or harm to the person or his clothing.

Serious accidents which frequently occur in shops and factories from the clothing becoming entangled with and wound upon the exposed ends of wheel hubs or rotating shafts, especially wheel hubs which are fastened on shafts with set bolts or projecting keys, are thus avoided.

In place of the bolt or rod *e* for pivotally securing the cap or shield on a wheel hub or projecting shaft, the cap may be held in place thereon as shown in Fig. 2, by forming an annular groove *i* in the periphery of the hub or shaft and providing the cap or shield *d* with a projection to engage with the groove. Such projection may consist as shown, of a pin or screw *j* threaded or otherwise removably fitted in the peripheral wall of the cap, the head of the pin or screw being preferably countersunk in the cap to avoid an external projection thereon.

For the protection of a wheel hub or the like, fastened on a shaft by a set bolt *k* in a well known manner, as shown in Fig. 3, the cap or shield *d'* may be formed in its peripheral wall with an internal recess $h'$ to clear the protruding head of the set bolt and permit it to rotate with the hub freely when the cap or shield is arrested. The cap or shield may be axially and rotatably connected with the shaft and confined in place over the hub by a shouldered pin or screw $e'$ threaded or otherwise removably held in an axial socket or hole in the end of the shaft $b$. The head of the pin or screw $e'$ is preferably countersunk in the cap so as not to project therefrom.

Where the end of a rotating shaft projects more or less from an adjacent bearing, as shown in Fig. 4, in which $l$ designates the bearing, the cap or shield $d$ may be fitted over and inclose or cover the exposed end of the shaft $b$, to which it may be rotatably and axially secured by a pin or screw $e'$, or by an external annular groove formed in the shaft, and an inward projection such as a pin or screw, substantially as shown in Fig. 2, for engagement with the groove.

The operation or effect of the several forms of the guard shown by the drawing, is substantially the same.

Various modifications in the details of construction of the cap or shield and in the means of rotatably and axially securing it in place on a hub, shaft or like rotating part, may be made without departing from the principle and scope of the invention as defined in the following claims.

I claim:

1. A guard for a rotary machine element consisting of a cap having a central internal bearing and adapted to loosely fit over the exposed end of said element and to be loosely confined thereon so that said element may freely rotate therein when the cap is arrested.

2. A guard for a rotary element having a lateral projection, consisting of a cap adapted to be axially and rotatably confined on said element over said projection and recessed to permit the projection to rotate therein when the cap is arrested.

3. A guard for the exposed end of a rotary element consisting of a cap loosely fitting over the same and having a central internal bearing surrounded by an annular recess; and an axial pivot connection for confining the cap in place on said element and permitting the cap to be arrested and the element to rotate freely therein.

In witness whereof I hereto affix my signature in presence of two witnesses.

OLE O. STORLE.

Witnesses:
 Chas. L. Goss,
 Frank E. Dennett.

Copies of this patent may be obtained for five cents each, by addressing the "Commissioner of Patents, Washington, D. C."